Sept. 3, 1935.  H. E. WANER  2,013,323
ABRASION SHOE FOR AIRFOILS
Filed Feb. 20, 1934
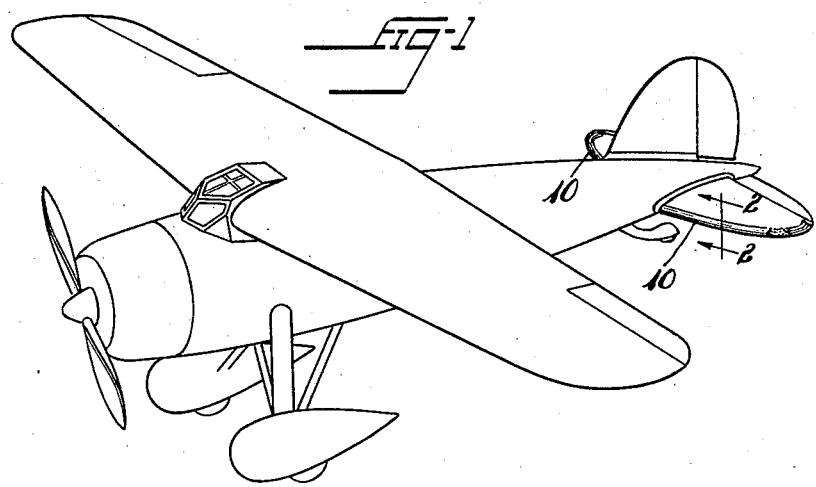
Fig-1
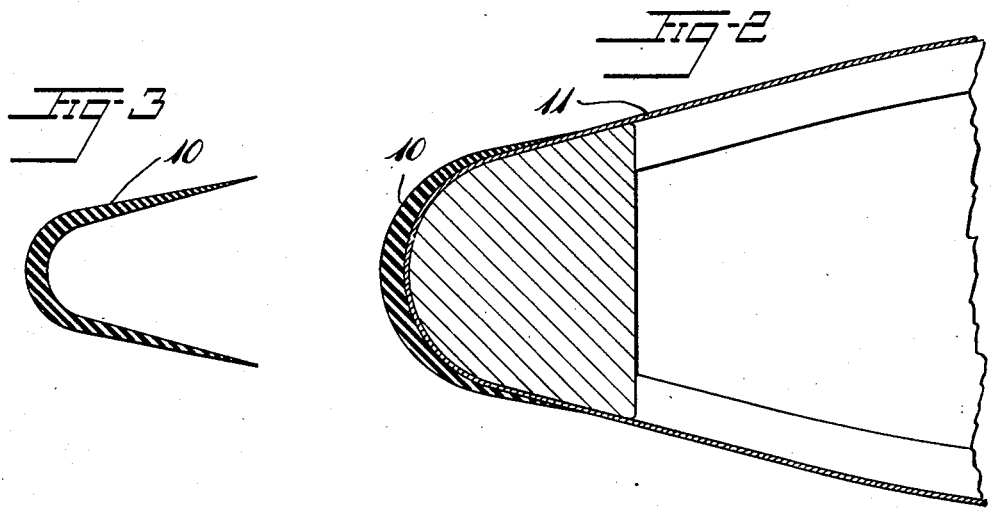
Fig-2
Fig-3
Fig-4
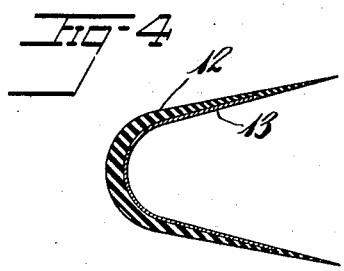
Inventor
Harry E. Waner
By Eakin & Avery
Attys Patented Sept. 3, 1935

2,013,323

UNITED STATES PATENT OFFICE 2,013,323

ABRASION SHOE FOR AIRFOILS

Harry E. Waner, Akron, Ohio, assignor to The B. F. Goodrich Company, New York, N. Y., a corporation of New York Application February 20, 1934, Serial No. 712,161

3 Claims. (Cl. 244—31)

This invention relates to means for preventing wear of the leading edge of an airfoil such as a wing or a control or other member of an aeroplane by sand, hail or like material in the air stream, and its general object is to provide an effective and economical device for this purpose.

A more specific object is to provide a more effective resistance to wear than is provided by a mere coating of rubber in unstrained condition and further objects are to provide the stated advantages without undesirable modification of the aerodynamic characteristics of the member and provide for facility of mounting the device.

Of the accompanying drawing:

Fig. 1 is a perspective view of an aeroplane and, mounted upon the horizontal stabilizer thereof, a device embodying my invention in its preferred form.

Fig. 2 is a section on line 2—2 of Fig. 1.

Fig. 3 is a cross-section of a rubber "shoe" embodying my invention in its preferred form as it appears before its application to the airfoil.

Fig. 4 is a cross-section of a similar shoe of rubber-and-fabric construction, having advantages in the matter of attachment but somewhat more expensive.

Referring to the drawing, the device comprises a "shoe" of U-shape in cross-section, molded with sharper curvature than that of the surface to which it is to be applied. The shoe has its greatest wall thickness in the vicinity of the bend of the U and its legs or wings are of diminishing thickness toward their margins, each of which preferably terminates substantially in a feather edge, for minimum interference with the streamline form of the airfoil upon which the shoe is mounted, in conjunction with adequate thickness for long resistance to wear at the leading edge of the airfoil, where the impact of particles in the air stream is greatest and the abrasion most destructive in the case of an unprotected airfoil.

The "shoe" may be an all-rubber member 10, Figs. 1, 2 and 3, for economy of manufacture, in which case it is applied directly to the airfoil and secured thereto, preferably by being cemented to the surface material of the airfoil such as the usual "doped" fabric 11 (Fig. 2).

The shoe being molded with a sharper curvature than that of the surface to which it is to be applied, its being spread or bent to its final form in place upon the airfoil involves a bending of its wall which puts its outer, exposed, forward surface under compression, and thus makes it more highly resistant to abrasion than the same rubber composition is when it is in an unstrained condition and much more highly resistant than the same composition is when its exposed surface is under tension, as it is when a flat or only slightly curved sheet of rubber is bent about an object of sharper curvature.

The "shoe" of Fig. 4 differs from that of Figs. 1, 2 and 3 in that it comprises an outer, abrasion-resisting layer 12 of rubber and an inner layer or liner 13 of fabric, the two being molded and vulcanized together in the sharply curved shape, the fabric layer resisting stretching of the inner surface of the structure in the bending of the shoe to less sharply curved form in applying it to the airfoil and thus putting the exposed outer rubber surface under relatively high compression. The fabric also may serve as an anchorage for the heads of tacks in case it is desired to tack the "shoe" to the airfoil and force the heads of the tacks through the rubber to the fabric.

I claim:

1. A protective shoe for the leading edge of an airfoil comprising a layer of rubber having in cross section, when in unstrained condition, a U-shape of sharper curvature than that of the surface to which it is to be applied.

2. A protective shoe as defined in claim 1 in which the wings of the shoe are of diminishing thickness toward their margins.

3. A protective shoe as defined in claim 1 comprising a lining layer of relatively inextensible material adhered to the inner surface of the rubber layer.

HARRY E. WANER.